United States Patent Office 2,999,197
Patented Sept. 5, 1961

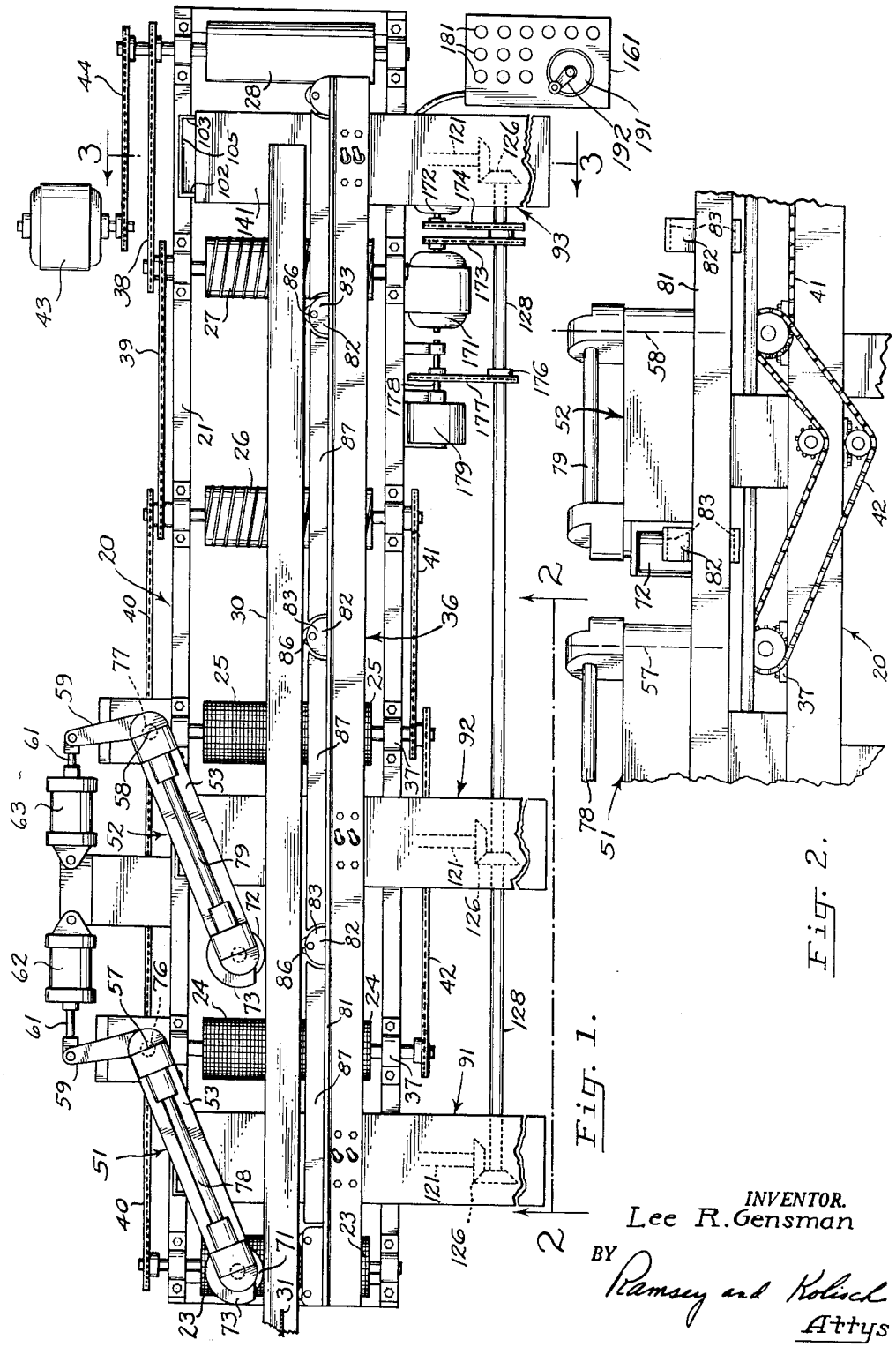

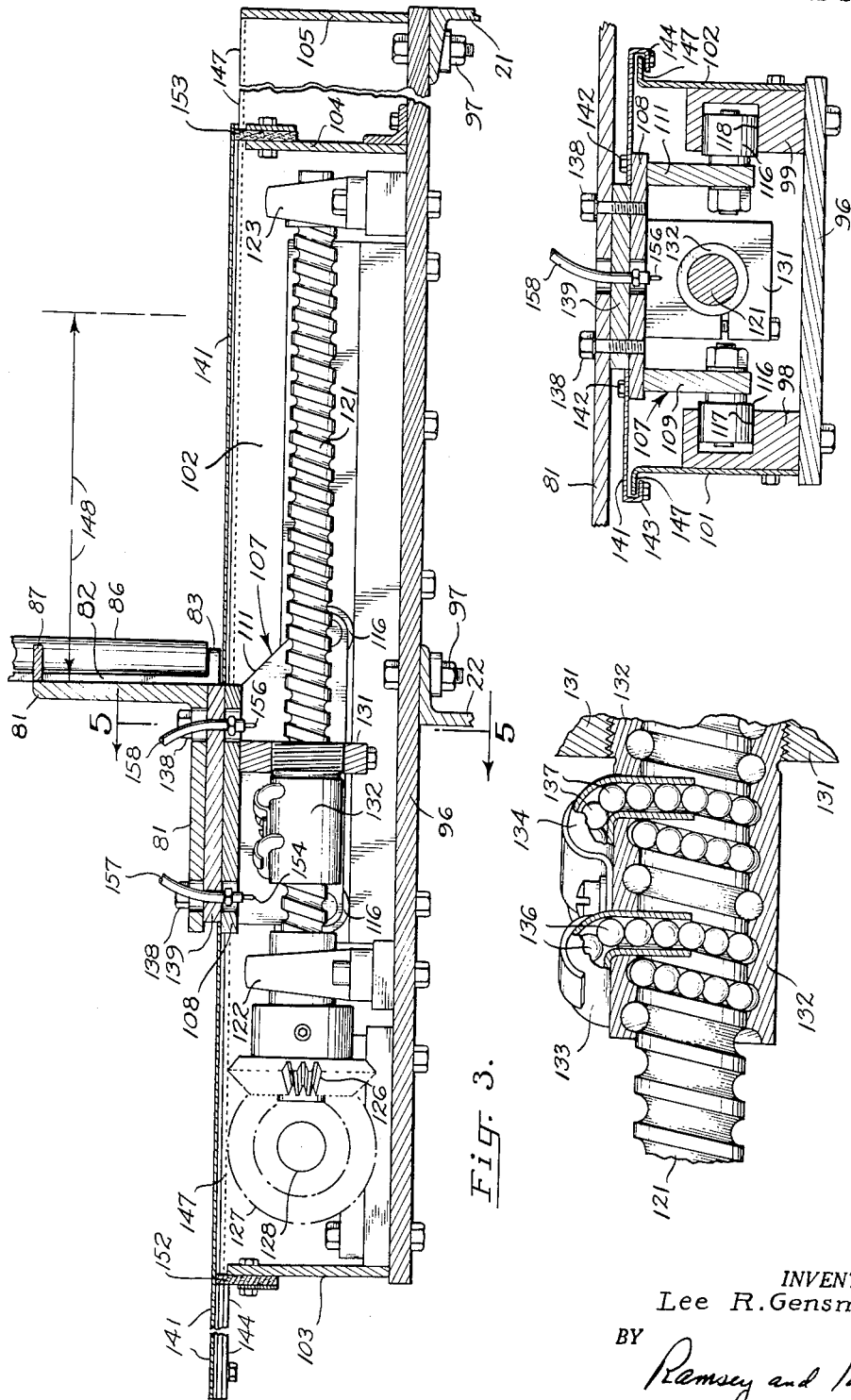

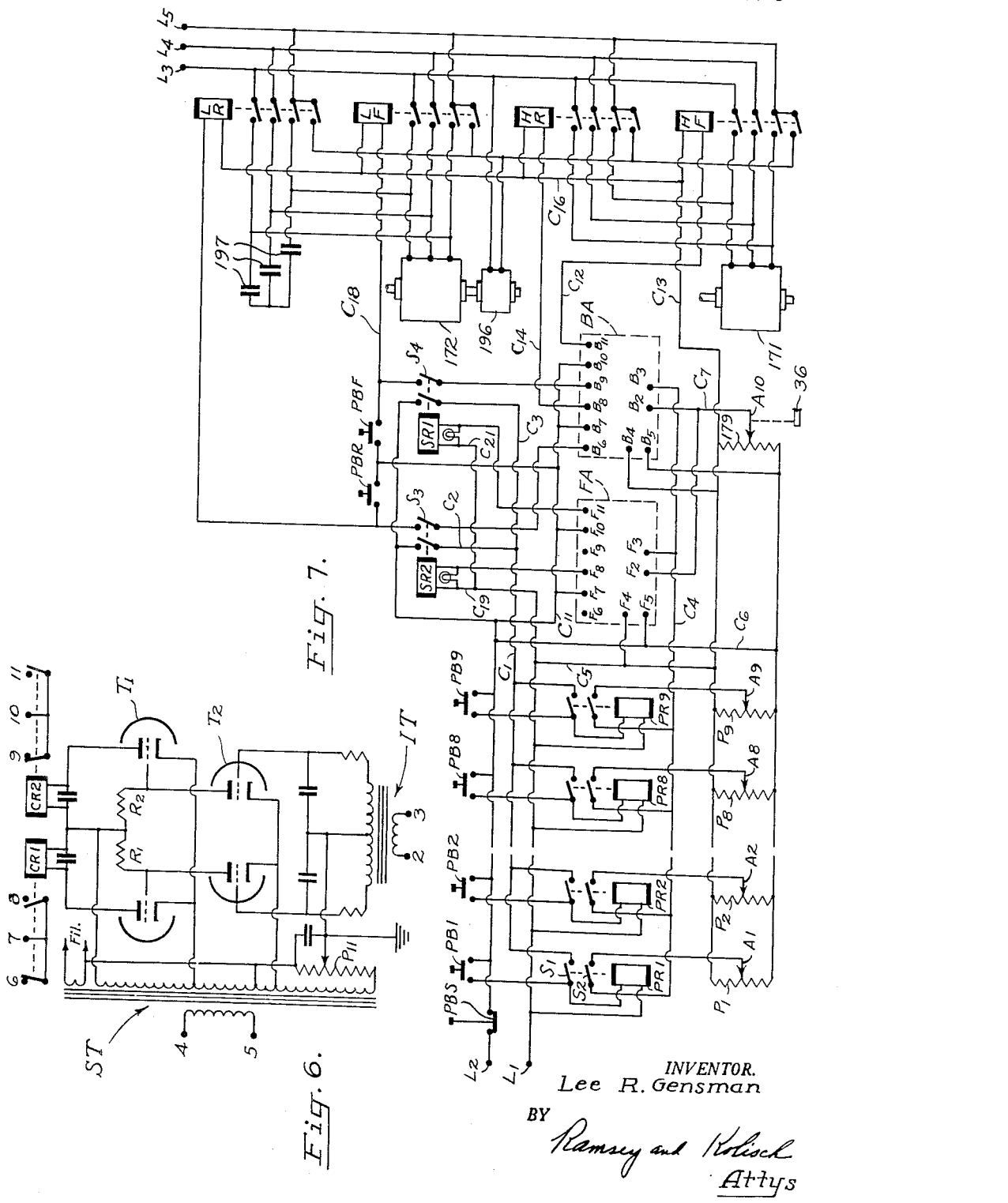

2,999,197
MOTOR CONTROL SYSTEM
Lee R. Gensman, Tigard, Oreg., assignor to Monarch Forge & Machine Works, Inc., Portland, Oreg., a corporation of Oregon
Filed Aug. 19, 1957, Ser. No. 678,795
7 Claims. (Cl. 318—29)

This invention relates to wood sawing machines and to a control mechanism for adjusting the position of a movable part or mechanism in a machine. In a wood sawing machine, an adjustable part of this description may be exemplified by the movable line bar, which is adjusted on the frame of the machine, thereby to vary the width of cut made by the machine. More particularly, this invention relates to a novel saw machine construction having a guide means, illustrated by the line bar found in conventional resaw machines, which may be accurately and rapidly set to selected positions of adjustment with substantial reduction in deviations in the setting of the guide means from the true position desired. The invention further concerns a novel, remotely operated control mechanism for adjusting the position of a part in response to selections made by a machine operator.

Generally, it is an object of this invention to provide, for a wood sawing machine, a novel guide means and mechanism for moving the guide means which is characterized by a construction which enables the guide means to be set readily in selected positions of adjustment smoothly and with a reduced amount of error in the setting.

Another general object is to provide a control mechanism for remotely adjusting the position of a movable part, the control mechanism being ideally suited for the adjustment of a guide means in a saw machine, which is reliable, easy to adjust, and features a novel operating principle wherein the movable part is moved into the vicinity of a selected position of adjustment at a relatively constant speed regardless of the total movement which the part may undergo in moving to the adjusted position. As a result, a characteristic of the control mechanism is a substantial reduction in irregularities which otherwise arise from inertia effects in the mechanism, enabling a greater degree of control over the positioning of a movable part than previously possible.

In the lumber industry, due to the decreasing supply of quality timber, it has become of prime importance that maximum use be made of each piece of timber processed. Pieces which heretofore were discarded as waste presently are cut and planed into finished boards. This practice has highlighted the necessity for accurately setting the width of cut made by any saw machine in order to eliminate waste by reason of offcut sizes and to accommodate the cutting of a usable board from strips which otherwise would be discarded as waste. Coupled with the requirement of accuracy is the necessity that adjustments of width of cut be made as rapidly as possible to reduce labor costs and increase the efficiency of a mill.

By way of example, it is common practice in sawmills today to pass lumber cants one or more times through a resaw machine, thereby to produce lumber slabs having a thickness depending upon the setting of the band saw of the resaw machine relative to the guide means or line bar which positions the cant during a cutting pass. This invention is discussed herein with reference to a resaw machine although it is obvious that the invention is applicable to other saw machines requiring relative adjustment of a saw and the guide means employed in the machine. A typical resaw machine includes a frame which has a series of rollers or conveyers mounted in the frame and defining a table or bed in the machine. A cant placed on the rollers is moved longitudinally along the machine into the forward cutting edge of a band saw mounted at one end of the machine. The cant is moved up against a line bar disposed at one side of the machine prior to making a cutting pass. The width of a slab cut by the band saw depends upon the lateral setting of the line bar relative to the band saw blade.

Constructions known heretofore have had a number of disadvantages which have limited the usefulness of the machines. Acme threaded screw and nut arrangements have been used for adjusting the lateral position of the line bar. The dimensional difference between the thread of the screw and the thread of a nut of an Acme thread ordinarily, when new, is somewhere near .03 of an inch. This difference in dimension of the mating parts increases with wear. Further, wear in the screw and nut does not occur evenly throughout the length of the screw and nut, but instead occurs at selected points and along one side of the threads, depending upon the setting of the line bar, where the majority of passes past the band saw are made and where the most resistance to movement of the line bar is usually encountered. The setting of a line bar equipped with an Acme threaded screw and nut assembly for adjusting the position of the line bar is inherently subject to error because of the play which occurs between the screw parts, this error increasing rapidly with wear of the machine.

In addition to errors in setting which occur by reason of the discrepancy in the size of the mating parts employed, deviations also arise because of the friction existing between the parts and the jerky and uneven resistance to relative turning movement between the screw and nut which results. If a conventional screw and nut is employed for adjustably positioning a line bar, when the power means employed for turning one of these elements is stopped, relative turning movement of the elements continues for a certain amount of time because of inertia in the moving parts of the machine. If the resistance offered to this relative turning movement is jerky and uneven, it is difficult if not impossible to control the travel that occurs between the time the power means is deactuated and the time the line bar finally comes to rest. As a result, errors in setting occur. This problem cannot be eliminated by the use of stops or fixed abutments, since a rebound or bounce in the line bar tends to be produced. Further, inaccuracies are introduced by reason of the fact that the friction between the parts is not constant, but instead varies considerably, depending upon the life of the machine and its condition.

More specifically, it is an object of this invention to provide, for a line bar or guide means in a saw machine, a motor and power-transmitting means connecting the motor to the line bar to adjustably position the line bar, wherein the power-transmitting means comprises an elongated, helically grooved element which engages and is threaded into a nut element having a ball bearing screw assembly. The ball bearings of the nut element revolve in the helical grooves of the elongated grooved element and provide a low friction, evenly wearing connection between the motor and the line bar. Further, the dimensional difference between the size of the mating parts using a ball bearing nut element can be reduced considerably below that possible with an Acme threaded nut.

The invention further contemplates incorporating in a saw machine, in combination with such a helically grooved element and ball bearing nut element, means devoid of fixed stops for setting the guide means or line bar of the saw machine at selected positions of adjustment for the line bar. The line bar is moved by a power means driving the line bar into a position next to but not coincident with the selected position of adjustment for the line bar. When the power means is stopped, the line bar undergoes a slight amount of transitional movement, i.e., coasting due to inertia, in moving to its selected position of adjustment. By including a relatively low and constant friction power-transmitting means between the power means and line bar, the amount of transitional movement of the line bar to a selected position of adjustment can be quite accurately determined in advance when setting up the machine. The effects of backlash and rebounding are substantially eliminated, and highly accurate settings of the line bar are possible.

The helically grooved lead screw element and the ball bearing nut element are contained within a cover structure arranged about the elements and defining an enclosure for the same. One or more nozzle means with its discharge end communicating with the interior of the enclosure ejects lubricant in a vapor stream into the interior of the enclosure. The enclosure prevents sawdust and other foreign matter from gumming up and collecting on the screw threads of the helically grooved element and, further, acts to contain the vaporous lubricant about the elements so as to maintain the friction in the parts at a minimum.

Included in the objects of this invention is the provision of a novel control mechanism for adjusting the position of a movable part. In the case of a resaw machine, it is highly desirable that the setting of the line bar occur as rapidly as possible for efficient operation of a mill. Ordinarily, this would dictate the use of a fairly high speed motor drive means. However, the inertia of the moving parts in a high speed motor drive means has the effect of introducing a rather extended time interval before the moving parts of the motor drive means reach their running speed. This is troublesome if a part is only to be moved a short distance since the distance the part is going to move when the motor is shut off depends to some extent upon the speed and momentum of the moving parts in the motor at the instant it is shut off.

It is an object of this invention to provide, in control mechanism for adjusting the position of a movable part, a pair of motor drive means, a low and a high speed motor drive means, respectively, and control means for the motors operable to actuate the high speed motor for gross positioning of the part only.

According to this invention, when the part moves within a predetermined distance of a selected position of adjustment for the part, the high speed motor is deactuated by the control means and the low speed motor is actuated. The low speed motor then moves the part into a position next to but not coincident with the selected position of adjustment for the part. By employing a low speed motor drive means for final positioning of the part, the speed and momentum of the moving parts in the motor which does the final positioning of the part tend to be the same regardless of the total distance the part is moved. If the part, in moving to a selected position of adjustment, moves a relatively short distance only, then only the low speed motor is actuated, the moving parts of the low speed motor reaching their running speed after a relatively short time interval.

It is, therefore, another object of the invention to provide control mechanism for moving a part into a selected position of adjustment which employs a high and a low speed motor and which is operable to actuate in sequence first the high speed and then the low speed motor selectively for gross adjustments of the position of the part, and operable to actuate only the low speed motor for relatively small adjustments of the position of the part.

It is another object of this invention to provide, for such control mechanism, circuit means regulating the actuation of the motors which responds to a signal voltage variable in amplitude and changing in phase relative to the phase of a voltage source. The amplitude of the signal voltage depends upon the displacement of the part (line bar) from its selected position of adjustment. The motors of the control mechanism are actuated and deactuated depending upon the amplitude of the signal voltage, and not by the closing of any limit switches placed in the path of the movable part. This type of control for the motors (1) eliminates the need for including a large number of limit switches in the mechanism and depending upon the mechanical movement of switch parts for control of the motors and (2) more important, greatly facilitates making the minute adjustments which ordinarily must be performed when setting up the machine for proper operation. The relation of the phase of the signal voltage with reference to the phase of the source voltage is used for controlling the direction of rotation of the motors in the mechanism. In this manner, a movable part may be moved either forwardly or backwardly, depending upon the direction of its displacement from a selected position of adjustment for the part.

The foregoing and additional objects and advantages, looking especially to a machine which may rapidly and accurately be set to produce a cut of a desired width and novel means for remotely controlling a movable part on the machine, are attained by the present invention, the invention being described hereinbelow in conjunction with the accompanying drawings, wherein:

FIG. 1 is a top view of a resaw machine, such as may be used for cutting lumber cants into slabs, having transfer rolls arranged along the way or bed of the machine and a line bar movable laterally thereover for varying the width of cut made by the machine;

FIG. 2 is a partial side view along the line 2—2 in FIG. 1;

FIG. 3 is a section view along the line 3—3 in FIG. 1, showing one of the head block assemblies in the resaw machine;

FIG. 4 is a view, partly broken away, of the helically grooved lead screw element and ball bearing nut element employed;

FIG. 5 is a section view along the line 5—5 in FIG. 3;

FIG. 6 is a schematic showing of an amplifying and regulating circuit which may be used for amplifying signal voltages used in regulating the control mechanism; and FIG. 7 is a schematic showing of a control circuit showing the interconnection of the remote selectors of the control mechanism and the motors employed, whereby the selectors are operable, when actuated, to control actuation of the motors.

Referring now to the drawings for a detailed description of the present invention, and in particular to FIGS. 1 and 2, a resaw machine constructed according to this invention comprises generally frame structure 20 having frame members 21, 22 carrying a series of rolls 23–28 spaced at intervals along frame structure 20 and defining with their upper portions a way or bed along which a piece of lumber, illustrated by cant 30, may be transported longitudinally of the machine. Located at the forward end of the machine, to the left-hand side of FIG. 1, is a power-driven band saw illustrated in section at 31. The band saw and means driving the saw are conventional, the cutting teeth of the saw projecting rearwardly or to the right in FIG. 1. The saw teeth engage a lumber cant so as to cut the cant into slabs as the cant is moved against the saw teeth by movement of the cant to the left in FIG. 1.

Extending longitudinally of frame 20 laterally to one side of band saw 31 is an elongated line bar assembly, indicated generally at 36. The line bar serves as a guide means for positioning a cant when the cant is moved along the frame into the path of band saw 31. In the embodiment illustrated, roll 28 is smooth, rolls 26 and 27 contain spiral flanges or shoulders operable, upon rotation of the rolls, to thrust a cant carried thereon against the line bar assembly, and rolls 23, 24, 25 are provided with a series of teeth operable to bite into a cant and move the cant into the band saw at a speed determined by the rotary speed of the rolls.

Rolls 23–28 are rotatably mounted in frame structure 20 by means of brackets 37 secured to the frame structure and rotatably carrying the center shafts for the rolls. Chains such as chains 38–42, reeved about sprockets secured to the ends of the center shafts for the rolls, function to rotate simultaneously rolls 23–28 so that a cant is transported forwardly in the machine. Any suitable means such as motor 43 and drive chain 44 are provided to rotate chains 38–42.

Carried forwardly on frame structure 20, near band saw 31, are a pair of crowder roll assemblies 51 and 52. Each comprises a casing portion 53 extending vertically upwardly from the bed of the machine. The casing portion of each of the crowder roll assemblies is pivotable, relative to frame structure 20, about a vertical axis indicated, for the two crowder roll assemblies, at 57 and 58, respectively.

Power means are included for pivoting the casing portions about their axes. Referring in particular to FIG. 1, affixed to each of the casing portions is an arm 59. The outer end of each arm 59 is connected to a rod 61 of a double acting piston-cylinder fluid motor. These fluid motors are indicated at 62 and 63, respectively. When fluid under pressure is admitted into the right side of piston-cylinder 62, rod 61 of the piston-cylinder is extended from the piston-cylinder and swings crowder roll assembly 51 about axis 57 so that the free end of the assembly moves toward the line bar assembly. The other crowder roll assembly is swung about axis 58 by admitting pressure fluid into the right side of piston-cylinder 63 so as to retract rod 61 within the piston-cylinder. Conventional means are provided for regulating the admission of pressure fluid to motors 62, 63 and thus the positions of the crowder roll assemblies.

Rotatably carried at the outer end of each of the crowder roll assemblies is a vertical crowding roll, indicated at 71 and 72. A cover 73 affixed to the casing portion of each crowder roll assembly covers the outer portion of each crowding roll. The inner portion of each crowding roll, that is, the lower portion illustrated in FIG. 1, is left uncovered and comes into contact with a lumber cant passed through the resaw machine.

Each of the crowding rolls 71 and 72 is rotated at a speed corresponding to the peripheral speed of rolls 23–28. Drive may be transmitted to the crowding rolls in a conventional manner as by shafts 76 and 77 extending vertically upwardly from frame structure 20 and driven at their lower ends by a set of miter gears, one of which is affixed to the center shaft of one of the rolls 24 and 25. The upper ends of shafts 76 and 77 transmit drive through a second set of miter gears to horizontal shafts 78 and 79. The outer end of each of these shafts is connected through a third set of miter gears to the center shaft of one of the crowding rolls 71, 72. The crowding rolls are provided to urge cants against line bar assembly 36 so as to position in the cant against the line bar assembly prior to a cutting pass through the band saw. During a cutting pass, fluid pressure in fluid motors 62, 63 actuates motors 62, 63 so that the crowding rolls yieldably hold a cant in position.

With reference again to line bar assembly 36, in the embodiment illustrated, the line bar assembly is comprised of an elongated angle iron 81 extending longitudinally of frame 20, substantially the length of the frame. Carried at intervals along the inner face of angle iron 81 are a number of brackets 82 having upper and lower ear portions 83. Extending between these ear portions, in an upright position and rotatably mounted in the ear portions, are a series of rollers indicated at 86. These rollers define a guide plane for a cant as it is moved longitudinally along the line bar. Guide rail portions 87 may be included in the space between rollers 86 to prevent odd lengths of lumber from skewing on the machine. The line bar is laterally movable in a path to-and-fro over the top of the frame structure and is adjustable thereon to selected positions of adjustment by means of three head block assemblies generally indicated at 91, 92, and 93. The line bar constitutes a guide means or movable part determining the width of cut made by the band saw.

The head block assemblies for the line bar are similar to each other. With reference in particular to FIGS. 1, 3, and 5, each of the head block assemblies includes an enclosure comprised of a base plate 96 secured to frame members 21 and 22 as by nut and bolt assemblies 97 and having a pair of guide rail members 98 and 99 secured to the base plate and extending longitudinally along the plate on either side of the plate, respectively. Side walls 101 and 102 are affixed along the outer side of the guide rail members and form the sides of the enclosure. End walls 103, 104, secured in an upright position to plate 96, define the ends of the enclosure. A spacing wall 105 at the right-hand end of plate 96 in FIG. 3 braces the ends of side walls 101, 102.

Mounted for movement longitudinally within each of the enclosures of a head block assembly is a carriage 107. The carriage includes a horizontal plate portion 108 which has affixed to each of its sides a pair of vertical plate portions 109 and 111, respectively. Rotatably carried at either end of the lower portion of each of the vertical plate portions 109, 111 is a roller 116. Rollers 116 roll in tracks 117 and 118 formed in guide rail members 98 and 99. The outer dimension of the rollers is somewhat less than the inner dimension of each of the tracks to enable the rollers to move freely to-and-fro in the tracks 117, 118.

Extending longitudinally down substantially the middle of each enclosure is an elongated, helically grooved lead screw element 121. The lead screw element is rotatably mounted at its ends in brackets 122 and 123 affixed to base plate 96 of the enclosure. One end of the lead screw element has affixed thereto a miter gear 126 adapted to be driven by a miter gear 127 affixed to a line shaft indicated at 128. The line shaft extends into an enclosure through a suitable aperture formed in the side wall of an enclosure.

Affixed to a clamp nut portion 131 depending downwardly from plate 108 of carriage 107 is a driven member comprising a nut element 132. The forward end of nut element 132 has a threaded portion which is inserted into the threaded portion of clamp nut portion 131. As will be noted with reference in particular to FIG. 4, the nut element contains a ball bearing screw assembly which is threaded onto and in engagement with the helical grooves of lead screw 121. The nut element is provided with a pair of tubular guides 133 and 134 which deflect two series of steel balls 136 and 137 across the helical grooves of the lead screw. The tubular guides direct the series of steel balls diagonally across the outside of the body of the nut element and then lead the balls back into the screw threads of the lead screw. The two tubular guides form a pair of closed circuits through which the racing balls, which act as a medium of engagement between the screw and nut, recirculate continually as the screw and nut are rotated relative to each other.

The line bar is affixed to carriage 107 by means of screws 138 fastening angle iron 81 to plate 108 through an intermediate plate 139. Lead screw 121 and nut element 132 comprise a driving and driven member, respectively, in a power-transmitting means transmitting drive from line shaft 128 to the line bar so as to move the line bar. Rotary motion of the lead screw is changed into linear motion of the carriage and the line bar assembly with a minimum amount of frictional loss. The dimensional difference between the mating parts of the nut element and the lead screw can readily be reduced to about .005 of an inch or less, which has the effect of reducing considerably the play between these parts. Wear of the lead screw and nut occurs evenly. The construction has been found to enable far greater accuracy in remotely controlling the position of a line bar than previously possible.

As discussed hereinabove, the enclosure for the head block assembly includes bottom, side, and end walls. Co-operating with these walls is a cover portion 141, fitted around intermediate plate 139 by means of a suitable aperture formed therein and affixed to carriage 107 as by screws 142. As can best be seen in FIG. 5, the cover portion is equipped along its longitudinal edges with a pair of channel elements 143 and 144. These channel elements are secured to the cover portion in any suitable manner. Each of the channel elements contains a slot which rides along a lip 147 formed by turning over the outer edge of each of the side walls 101 and 102. The cover portion is longer than the distance between end walls 103 and 104 and is proportioned so that during movement of the line bar between its limits of travel, indicated by arrow 148 in FIG. 3, the cover member shields off or closes the interior of the chamber defined between end walls 103, 104, bottom plate 96, and side walls 101, 102. Members 152 and 153 may be included along the upper edge of end walls 103, 104 for the purpose of making a tighter seal between the cover portion and the end walls.

Extending into the interior of each enclosure for each head block assembly, with their inner ends discharging into the interior, are a pair of nozzles 154 and 156. A vaporous lubricant is admitted into the interior of the enclosure by means of these nozzles, the lubricant lubricating rollers 116 as well as the lead screw ball bearing nut element described. The vaporous lubricant may be comprised of a conventional lubricant entrained in a stream of air and ejected under pressure into the interior of the enclosure. Conduits 157 and 158 supply nozzles 154, 156.

The line bar is positioned in selected positions of adjustment located in the path of the line bar by means of a remotely controlled control mechanism regulated by a plurality of distant selectors mounted in a control box indicated in FIG. 1 at 161. The mechanism for setting the line bar in its selected positions of adjustment is devoid of fixed stops but depends, instead, upon the actuation and deactuation of motors driving line shaft 127. By eliminating any fixed stops for the adjustment of the line bar, the line bar moves to an adjusted position without bouncing or rebounding off any abutment. Upon deactuation of the motor means driving line shaft 128, due to the inertia of the motor and the other moving parts, some continued movement of the line bar occurs. For this reason, the control mechanism for the line bar deactuates the drive to the line shaft when the line bar moves into a position next to but not coincident with the selected position of adjustment for the line bar. The line bar then undergoes a small amount of transitional movement in moving to its selected position of adjustment. A pair of motor drives are used for rotating the line shaft, a high and low speed motor, respectively, to permit rapid adjustment of the line bar yet, at the same time, to reduce errors in setting which would occur if only a high speed motor were used when small adjustments were made, the error arising, in this instance, from the fact that the motor may not have a chance to reach its running speed before being shut off.

Referring to FIG. 1, line shaft 128 extends longitudinally along frame 20 to one side of the frame with miter gears connected thereto driving miter gears affixed to lead screws 121. Carried by frame structure 20 at the rear end of the frame structure are a pair of motors, a high speed motor 171 and a low speed motor 172. These motors are drivingly connected to the line shaft by chains 173 and 174, respectively, reeved at one of their ends about sprockets affixed to the line shaft and at the other of their ends about sprockets affixed to the output shafts of the motors. As used herein, a "low" as compared to a "high" speed motor may refer to a motor having a rotor which moves at a slower speed than the rotor of the high speed motor, or it may refer to a motor having smaller parts and a lower horsepower rating than that of a high speed motor, the rotor moving at the same speed as the rotor of the high speed motor but rotating the work shaft connected thereto at a slower speed. In the latter instance, the momentum of the moving parts in the low speed motor is less than the momentum of the moving parts in the high speed motor, due to the smaller size of the parts.

Referring again to FIG. 1, affixed to the line shaft, forwardly of the sprockets connecting the low and high speed motors to the shaft, is a sprocket 176 engaging a chain 177. Chain 177 is reeved about a sprocket secured to a stub shaft 178 which has one of its ends extending into the cage of a potentiometer, indicated at 179. The stub shaft is connected to the sliding contact of the potentiometer and is operable, when rotated, to move the sliding contact over the resistance for the potentiometer. The position the sliding contact occupies is related to the position of the line bar relative to its base position. The line bar occupies its base position when it is moved upwardly in FIG. 1 directly adjacent the saw line of band saw 31.

A control means or circuit for the high and low speed motors is illustrated schematically in FIGS. 6 and 7. The majority of the wiring and the electrical elements of this control circuit have been eliminated from the other figures of the drawings for reasons of clarity. It should be realized, however, that the wiring and circuit elements of FIGS. 5 and 6 are present in the structures illustrated in the remaining figures in the drawings. Control of the motors is brought about by a signal voltage varying in phase and amplitude depending upon the displacement of the line bar from a selected position of adjustment for the line bar.

Referring to FIG. 1, it will be noted that the control box 161 has twelve push-buttons indicated at 181. Nine of these push-buttons, which constitute distant selectors, control the automatic positioning of the line bar relative to its base position. The remaining three push-buttons are employed to shut off the machinery and for nonautomatic positioning of the line bar either in a forward or a reverse direction.

In general, motors 171, 172 driving line shaft 128 are controlled by a Wheatstone bridge type of circuit, the proportion of the resistances in the two legs of one branch of the Wheatstone bridge being selected by actuating the selector which determines the selected position for the line bar, and the proportion of the resistances in the two legs of the other branch of the Wheatstone bridge being determined by the actual position the line bar occupies at any given time, the line bar adjusting the sliding arm of potentiometer 179. When the proportion of the resistances in the two legs of one branch is equal to the proportion of the resistances in the two legs of the other branch, the error signal voltage created between the two branches is zero, and the line bar occupies a selected position of adjustment. If the line bar is positioned to one side of its selected position of adjustment, an unbalanced condition is created between the two branches of the Wheatstone bridge, which results in the production of a signal voltage between the two branches which is amplified to control actuation of the motors.

Referring to FIG. 7, each of the nine of the push-buttons 181 which control the automatic positioning of the line bar is connected to a push-button switch, exemplified by the switches indicated by the designations $PB_1$, $PB_2$, $PB_8$, $PB_9$ in FIG. 7. The switches for the five remaining push buttons controlling automatic positioning of the line bar have been eliminated in FIG. 7 for the sake of simplicity. When any one of the push-button switches $PB_1$–$PB_9$ is closed, a push-button relay associated with the switch is energized since closing the push-button switch completes a circuit from a line conductor $L_1$, through a push-button relay, to a second line conductor $L_2$. These relays are indicated at $PR_1$, $PR_2$, $PR_8$, and $PR_9$. Line conductors $L_1$ and $L_2$ are supply conductors, normally of an alternating current such as a 60 cycle A.C. current.

Specifically, with reference to switch $PB_1$ when this switch is closed, a closed circuit is formed between conductor $L_2$ and conductor $L_1$ through relay $PR_1$. Relay $PR_1$ includes a pair of switches which are both closed upon energizing of the relay. Relay $PR_1$, as well as the other relays discussed herein, are conventional, having a movable armature which is spring biased to one extreme position and describes a to-and-fro movement when energized and then de-energized, respectively.

One of the switch contacts of relay $PR_1$ is connected by conductors $C_1$, $C_2$, and $C_3$ to one of the switch contacts of a double switch relay $SR_2$, and to one of the switch contacts of another double switch relay $SR_1$. As will be described hereinbelow, relays $SR_1$ and $SR_2$ are signal relays which are normally energized whenever the line bar is out of a selected position of adjustment for the line bar. Energizing of relays $SR_1$ and $SR_2$ functions to close the two switches of each of the relays. When either relay $SR_1$ or relay $SR_2$ is energized, conductor $C_1$ is connected either through conductor $C_2$ and one of the switches of relay $SR_2$, or through conductor $C_3$ and one of the switches of the relay $SR_1$ to line conductor $L_2$. One of the switch points $S_1$ of relay $PR_1$, which completes the connection between conductor $C_1$ and conductor $L_1$ through relay $PR_1$, thus acts to hold relay $PR_1$ energized after the release of switch $PB_1$, providing either relay $SR_1$ or $SR_2$ is energized.

The other of the switch points $S_2$ of relay $PR_1$ connects an arm $A_1$ of a potentiometer $P_1$ through a conductor $C_4$ to terminals $F_3$ and $B_3$ of a pair of phase sensitive amplifiers indicated at FA and BA, respectively.

Push-button switches $PB_2$, $PB_8$, and $PB_9$ are similar to push-button switch $PB_1$, each, when closed, serving to energize a relay associated therewith. One of the switch points of each of these relays connects conductor $L_1$ through the relay to conductors $C_1$, $C_2$, and $C_3$, thereby serving to hold the relay energized after release of the push-button switch associated therewith, providing either relay $SR_1$ or $SR_2$ is energized. The other switch point of each of the relays connects arms, indicated at $A_2$, $A_8$, and $A_9$, of potentiometers $P_2$, $P_8$, and $P_9$, respectively, to conductor $C_4$ and terminals $F_3$ and $B_3$ of amplifiers FA and BA.

Referring to FIG. 1, it will be noted that control box 161 includes a dial 191 having a movable handle 192 superposed thereover. Handle 192 manually moves arm $A_9$ of potentiometer $P_9$ to permit adjustment of the potentiometer by the operator of the resaw machine. The other of the potentiometers normally are adjusted when the machine is set up and remain in this adjusted position during operation of the machine. The adjustable arms of these potentiometers accordingly are not exposed to view in FIG. 1. In other words, push-button switches $PB_1$–$PB_8$ are used to determine selected positions of adjustment for the line bar which normally remain set during operation of the machine whereas push-button switch $PB_9$, controllable through handle 192, enables the machine to be set for cutting an unusual width during a particular run.

With reference again particularly to FIG. 7, potentiometer 179 controlled by the line bar, together with potentiometers $P_1$–$P_9$, are connected at one of their ends through a conductor $C_5$ to line conductor $L_1$. The other ends of the potentiometers are connected through a conductor $C_6$ to line conductor $L_2$.

The movable arm $A_{10}$ of potentiometer 179, controlled by the position of the line bar, is connected by conductor $C_7$ to terminals $F_2$ and $B_2$ of amplifiers FA and BA. One branch of the Wheatstone bridge circuit controlling motors 171, 172 is comprised of the resistor of potentiometer 179, and the other branch of the Wheatstone bridge circuit is comprised of the resistor of one of the potentiometers $P_1$–$P_9$, depending upon which the relays $PR_1$–$PR_9$ is energized. The bridge between the two branches is comprised of conductors $C_4$ and $C_7$, these conductors supplying an error signal voltage to terminals $F_2$ and $F_3$ of amplifier FA and terminals $B_2$ and $B_3$ of amplifier BA.

Phase sesitive amplifiers FA and BA, which constitute regulating circuits receiving the signal voltage of the Wheatstone bridge type of circuit described, are conventional units available on the market. The circuit for each of the amplifiers is the same and is illustrated in FIG. 6. Amplifying units of the type illustrated are sold by the General Electric Company as electronic positioning control CR–7510–A102, a schematic showing of the circuit for the unit being illustrated in their booklet numbered GE I–31257D under the designation P–9143014. The unit can distinguish the phase of a signal voltage delivered to the unit with reference to the phase of a source voltage fed into the unit. The unit also amplifies a signal voltage delivered to the unit. Referring to FIG. 6 for a general description of the amplifier employed, each amplifier has ten terminals indicated by the numerals 2–11. Two sources of voltage, ordinarily an A.C. voltage, are supplied to the amplifier: A supply or source voltage is supplied to terminals 4 and 5, and an error signal voltage is supplied to terminals 2 and 3.

The amplifier includes a pair of tubes indicated in FIG. 6 as tubes $T_1$ and $T_2$. Each of the tubes has a pair of grids and a pair of plate elements. The tubes produce two-stage amplification to an error signal delivered thereto. One of the grids and one of the plates of each of the tubes amplifies a signal voltage which is in phase with the voltage delivered from terminal 4 to terminal 5, and the other grid and plate of each of the tubes amplifies a signal voltage which has a phase difference of 180° with respect to the voltage delivered from terminal 4 to terminal 5.

The anodes of tubes $T_1$ and $T_2$ are connected to the same side of the secondary winding of a supply transformer ST. The primary winding of transformer ST is connected to terminals 4 and 5. The phase of the voltage supplied the anodes of tubes $T_1$ and $T_2$ corresponds to the phase of the voltage supplied terminals 4 and 5.

The grids of tube $T_1$ are supplied with an A.C. voltage from two sources. One, a bias voltage, is in phase on both grids and is supplied by a potentiometer $P_{11}$. The other is the error signal voltage which is supplied by the secondary of an input transformer IT. The primary winding of transformer IT through terminals 2 and 3 receives the error signal voltage. It will be noted that the error signal voltage is applied in opposite phases to the two grids of tube $T_1$.

Connected to each of the anodes of tube $T_2$ is a coil relay indicated at $CR_1$ and $CR_2$, respectively. Each coil relay is energized upon conduction of the anode of tube $T_2$ associated therewith. Coil relay $CR_1$ is ganged to switches controlling the connections between terminals 6, 7, and 8, and coil relay $CR_2$ is ganged to switches controlling the connections for terminals 9, 10, and 11. The switches in FIG. 6 are shown in the position they occupy when the coil relays are unenergized. The switches for terminals 6 and 9 open when relays $CR_1$ and $CR_2$ are energized, and the switches for terminals 8 and 11 close when relays $CR_1$ and $CR_2$ are energized.

In the absence of any error signal voltage supplied terminals 2 and 3 of the amplifier, the anodes of tube $T_1$ conduct current during the half cycles that the anodes are positive, as determined by the source voltage delivered to terminals 4 and 5 and transformer ST. Anode current through both anodes of tube 1 during the positive half cycles creates a relatively large voltage drop across a pair of anode resistors $R_1$ and $R_2$. As a result, the voltage on both grids of tube $T_2$ is increased in a negative voltage during these half cycles, cutting off conduction through tube $T_2$ so that relays $CR_1$ and $CR_2$ are deenergized or cut out. During the half cycles that the anodes of tube $T_1$ are negative, the anodes of tube $T_2$ are also negative, and as a consequence relays $CR_1$ and $CR_2$ remain de-energized during these half cycles as well.

When an error signal voltage is applied to terminals 2 and 3, conduction takes place through one-half of tube $T_2$, the particular half depending upon the phase of the error signal voltage. For instance, if the bias of the grid in the right half of tube $T_1$ in FIG. 6 is increased in a positive direction by an error signal voltage during the half cycles that the anodes of tube $T_1$ and $T_2$ are positive, the bias of the grid in the left half of tube $T_1$ increases in a negative direction during these half cycles. This causes conduction through the right half of tube $T_1$ during the half-cycles that its anode is positive, the impression of a large, negative bias on the grid of the right half of tube $T_2$, and a de-energized condition for relay $CR_2$. During the negative half cycles, the right half of tube $T_2$ is again in a nonconducting condition since the anode of tube $T_2$ is negative. Relay $CR_2$ is therefore dropped out. With respect to the left half portions of the tubes, the negative bias applied to tube $T_1$ cuts off conduction of the tube during the half cycles that its anode is positive. This causes conduction through the left half of tube $T_2$ during these half cycles and an energizing of relay $CR_1$. There is no current flowing through relay $CR_1$ during the half cycle that the anodes of tube $T_2$ are negative. However, the relay (as well as relay $CR_2$) is designed to remain in an energized condition or picked up condition when a pulsating current is applied to the relay.

If the signal voltage applied to terminals 2 and 3 has a phase difference of 180°, with respect to the conditions just discussed, current flows through relay $CR_2$ during the portions of the half cycle that the anode in the right half of tube $T_2$ is positive, and this relay is energized or picked up whereas relay $CR_1$ remains de-energized and dropped out. To summarize, relay $CR_1$ is picked up when the signal voltage from terminal 2 to terminal 3 is in phase with the source voltage from terminal 4 to terminal 5. Relay $CR_2$ is picked up when the phases of these voltages are 180° displaced. The sensitivity of the amplifiers may be regulated by adjusting potentiometer $P_{11}$.

As discussed hereinabove, a pair of motors are used for moving the line bar into selected positions of adjustment. Each of the amplifiers FA and BA receive the signal voltage created by an unbalance between the branches of a Wheatstone bridge type of circuit through terminals $F_2$, $F_3$, and terminals $B_2$, $B_3$, respectively. Amplifier BA is included for broad adjustment of the line bar and responds to relatively large error signals only. Amplifier FA, on the other hand, responds to signals of relatively smaller amplitude than amplifier BA, the response of the amplifier being determined by the adjustment of the potentiometer corresponding to the potentiometer $P_{11}$ in FIG. 6. Amplifier FA is for fine adjustment of the line bar. An interlock is arranged between the two amplifying circuits operable to prevent actuation of the low speed motor by amplifier FA during such intervals that amplifier BA is actuating the high speed motor.

Referring again to FIG. 7, terminals 2–11 of the amplifier illustrated in FIG. 6 are indicated for amplifier FA in FIG. 7 as terminals $F_2$–$F_{11}$ and for amplifier BA in FIG. 7 as terminals $B_2$–$B_{11}$. Terminals $F_7$ and $F_{10}$ of amplifier FA and terminals $B_7$ and $B_{10}$ of amplifier BA are connected by a conductor $C_{11}$ to line conductor $L_2$. Terminal $B_{11}$ of amplifier BA is connected by a conductor $C_{12}$ to one side of a high speed motor relay HF. The other side of relay HF is connected by a conductor $C_{13}$ to conductor $C_5$ and line conductor $L_1$. Relay HF, when energized, closes switches connecting motor 171 to conductors $L_3$, $L_4$, and $L_5$ supplying a three phase current to the motor to drive the motor. When relay HF is energized, motor 171 is driven in a forward direction. The relay is energized when a closed connection is made between terminals $B_{10}$ and $B_{11}$ of amplifier BA.

In a similar manner, terminal $B_8$ of amplifier BA is connected by conductor $C_{14}$ to one side of a high speed motor relay HR. The other side of relay HR is connected by conductor $C_{16}$ through conductor $C_{13}$ and conductor $C_5$ to line conductor $L_1$. Relay HR, when energized, is operable to actuate high speed motor 171 in a reverse direction, and the relay is energized when a closed connection is made between terminals $B_7$ and $B_8$ of amplifier BA.

Terminals $B_6$ and $B_9$ of amplifier BA are connected to one of the switch contacts of relays $SR_2$ and $SR_1$, respectively. A switch point $S_3$ of relay $SR_2$ connects, when closed, terminal $B_6$ with one end of a low speed motor relay LR. The other end of relay LR is connected by conductor $C_{16}$ to conductor $C_{13}$, $C_5$, and line conductor $L_1$. Relay LR, when energized, actuates low speed motor 172 in a reverse direction. In a similar manner, a switch point $S_4$ of relay $SR_1$ connects the switch contact of relay $SR_1$, which is connected to terminal $B_9$ of amplifier BA, to a conductor $C_{13}$, which is connected to a low speed motor relay LF, the other end of relay LF being connected to conductor $C_{16}$. Relay LF, when energized, is operable to actuate the low speed motor in a forward direction.

It will be remembered that amplifier BA responds to signals of relatively large amplitude only. With error signals of relatively small amplitude, the relay coils in amplifier BA, corresponding to relay coils $CR_1$ and $CR_2$ illustrated in FIG. 6, are de-energized and dropped out. This causes a connection to be made in amplifier BA between terminals $B_6$ and $B_7$ and between terminals $B_9$ and $B_{10}$. This, in effect, connects conductor $L_1$ with terminals $B_6$ and $B_9$, enabling relays $SR_2$ and $SR_1$ to actuate low speed motor 172 during such times as they are energized. The switches connecting terminals $B_6$ and $B_7$ and terminals $B_9$ and $B_{10}$ constitute interlock means interconnecting the amplifying circuits and preventing actuation of the low speed motor during actuation of the high speed motor.

With reference now in particular to amplifier FA, terminals $F_8$ and $F_{11}$ of the amplifier are connected to the coils of relays $SR_2$ and $SR_1$, respectively. The other ends of the coils for these relays are connected by conductors $C_{19}$ and $C_{21}$ to line conductor $L_1$. When a signal voltage of large enough amplitude to be picked up by amplifier FA is received by amplifier FA through terminals $F_2$ and $F_3$, either relay $SR_2$ or $SR_1$ is energized, depending upon the relation of the phase of the voltage from terminals $F_2$ to $F_3$ to the phase of the voltage supplied from terminals $F_4$ to $F_5$. If the voltages are in phase, a connection between terminals $F_7$ and $F_8$ is completed in amplifier FA, and relay $SR_2$ is energized. This serves to complete the circuit for relay LR, providing the signal received by amplifier BA is small enough so that the relays corresponding to relays $CR_1$ and $CR_2$ in the amplifier are dropped out. The low speed motor is then driven in a reverse direction. If the voltage to terminals $F_2$ and $F_3$ is 180° out of phase with respect to the voltage to terminals 4 and 5, then a connection is made between terminals $F_{10}$ and $F_{11}$ so that relays $SR_1$ and LF controlling actuation of the low speed motor in a forward direction are energized.

The three push-buttons 181 which stop the machinery and permit nonautomatic positioning of the line bar actuate switches indicated at PBS, PBR, and PBF in FIG. 7. Switch PBS is normally closed and, when actuated, opens line conductor $L_2$. Switches PBF and PBR control relays LF and LR, respectively.

Braking of the low speed motor when the line bar moves next to a selected position of adjustment for the line bar is accomplished by brake 196, which is conventional. Switches of relays LR, LF, HF, and HR are operable, when closed, to energize a solenoid motor in brake 196 thereby to release the brake. When the solenoid motor is unenergized, the brake shoe mechanism of the brake is urged by spring means into clamping engagement to set the brake. Braking of the low speed motor is also brought about by capacitors 197 which brake the motor electrically.

It will be remembered that the switch points holding relays $PR_1$–$PR_9$ energized after the release of the pushbutton switch associated therewith are held in a closed condition only if either relay $SR_2$ or $SR_1$ is energized. These, in turn, are energized only if a large enough error voltage exists to be picked up and amplified by amplifier FA. This arrangement causes the push-button relays $PR_1$–$PR_9$ to become de-energized automatically when the line bar moves into a selected position of adjustment for the line bar.

The operation of the device will now be described. For the purpose of illustration, it will be assumed that the line bar is spaced approximately adjacent the saw line for the resaw machine, and it is desired to move the line bar rearwardly back away from the saw line a relatively large distance, for example, three inches away. If push-button switch $PB_8$ controls the three-inch spacing for the line bar, potentiometer $P_8$, which is controlled by push-button switch $PB_8$, has been adjusted when the machine was set up so that the ratio of resistances of the upper and lower legs of the resistor in potentiometer $P_8$ (the portions to either side of the movable arm) is substantially equal to the ratio of resistances of the upper and lower legs of the resistor in potentiometer 179 when the line bar is spaced three inches away from the saw line for the machine. An error signal voltage is created between arms $A_8$ and $A_{10}$ whenever the line bar is positioned away from this three inch spacing and relay $PR_8$ is energized. This error signal voltage is delivered by conductors $C_4$ and $C_7$ to terminals $F_2$ and $F_3$ of amplifier FA and terminals $B_2$ and $B_3$ of amplifier BA. The potentiometer $P_{11}$ of amplifier BA is preset so that amplifier BA will amplify a signal delivered thereto as long as the line bar is farther than a predetermined distance away from a selected position of adjustment which may be assumed to be a half an inch. Potentiometer $P_{11}$ of amplifier FA has been set so that the signal delivered thereto will be amplified until such time as the line bar moves closely adjacent to but not coincident with its selected position of adjustment.

With the operating conditions described, when either of the motors is actuated, it is actuated in a reverse direction to obtain alignment of the line bar, and the signal voltage set up between arms $A_8$ and $A_{10}$ has the same phase as the voltage from terminals 4 and 5. Relays $CR_1$ of amplifiers FA and BA are energized and picked up, and relays $CR_2$ of amplifiers FA and BA are de-energized and dropped out. This results in an open connection between terminals $F_{10}$ and $F_{11}$ of amplifier FA and between terminals $B_6$ and $B_7$ and terminals $B_{10}$ and $B_{11}$ of amplifier BA. A closed connection exists between terminals $F_7$ and $F_8$, $B_7$ and $B_8$, and $B_9$ and $B_{10}$.

As a result, the circuit for relay HR, operating the high speed motor in reverse, is closed between conductors $L_1$ and $L_2$. Relay HF is de-energized because of the opening between terminals $B_{10}$ and $B_{11}$. Relay LR is de-energized since terminals $B_6$ and $B_7$ are not connected. Relay LF is de-energized because of the opening between terminals $F_{10}$ and $F_{11}$ which results in relay $SR_1$ being de-energized and switch point $S_4$ occupying an open position.

The line bar continues to move by the action of the high speed motor running in a reverse direction until the signal input to terminals $B_2$ and $B_3$ is not sufficient to cause a response in amplifier BA. This causes relay $CR_1$ as well as relay $CR_2$ of amplifier BA to be dropped out. Relay $CR_1$ of amplifier FA, however, is still energized and picked up by reason of the input signal to terminals $F_2$ and $F_3$. This causes relay LR to become energized, the connection between terminals $B_6$ and $B_7$ being made when relay $CR_1$ of amplifier BA was dropped out. Relay HR becomes de-energized when relay $CR_1$ of amplifier BA drops out. The remaining motor relays LF and HF remain de-energized for the same reasons that they were de-energized when amplifier BA was responding to a signal. As a result, the low speed motor is driven in a reverse direction until the line bar approaches its selected position of adjustment, at which time relay $SR_2$ opens and motor 172 stops.

When the line bar is driven in a forward direction instead of a reverse direction, the operation of a circuit is substantially similar to that described, save that relays $CR_2$ in the amplifiers are energized or picked up instead of relays $CR_1$, which causes the motors to turn in a forward direction, the motors again operating in sequence.

It is claimed and desired to secure by Letters Patent:

1. In a control system for adjusting a part movable in a path to selected positions of adjustment for said part, a pair of motors, signal means regulated by said part producing a signal voltage depending in amplitude upon the amount of displacement of said part from a selected position of adjustment for said part, a pair of voltage sensitive regulating circuits, receiving simultaneously the signal voltage produced by said signal means, one of said regulating circuits being placed in motor-controlling condition exclusively of the other in response to signal voltages falling within a given range of amplitudes, the other of said regulating circuits being placed in motor-controlling condition exclusively of said one in response to signal voltages falling within a second range of amplitudes that is larger than said given range, means connecting said one of said regulating circuits to one of said motors whereby it is operable to actuate said one motor exclusively of the other while responding to signal voltages in said given range, and means connecting said other of said regulating circuits to said other of said motors whereby it is operable to actuate said other motor exclusively of said one motor while responding to signal voltages in said second range.

2. In a control system for adjusting a part movable in a path to selected positions of adjustment for said part, a high speed and a low speed reversible motor drive means, a voltage source, signal means regulated by said part producing a signal voltage depending in amplitude upon the amount of displacement of said part from a selected position of adjustment for said part and having a phase relation with reference to said voltage source depending upon the direction of displacement of said part from a selected position of adjustment for said part, a pair of regulating circuits receiving simultaneously the signal voltage produced by said signal means, one of said regulating circuits being placed in motor-controlling condition exclusively of the other in response to signal voltages falling within a given range of amplitudes, the other of said regulating circuits being placed in motor-controlling condition exclusively of said one in response to signal voltages falling within a second range of amplitudes that is larger than said given range, means connecting said one of said regulating circuits to one of said motor drive means whereby it is operable to actuate said one motor drive means exclusively of the other while responding to signal voltages in said given range and in a direction depending upon the phase relation of said signal voltage and voltage source, and means connecting the other of said regulating circuits to the other of said motor drive means whereby it is operable to actuate said other motor drive means exclusively of said one while responding to signal voltages in said second range and in a direction depending upon the phase relation of said signal voltage and voltage source.

3. Mechanism for adjusting the position of a part mounted for movement in a path into selected positions of adjustment comprising the combination of a low speed drive means and a high speed drive means, means operatively connecting each drive means to said part whereby it is operable to move the part during such time as the particular drive means is energized, and control means for energizing selectively said low and high speed drive means, said control means comprising voltage producing means regulated by said part producing an electric voltage variable in magnitude in relation to the extent said part is positioned away from a selected position of adjustment, a voltage sensitive means sensitive to the magnitude of the voltage produced by said producing means, and electric relay means for each drive means for energizing the drive means, said voltage sensitive means actuating the relay means for the low speed drive means to cause continuous energizing of the low speed drive means when said electric voltage has a magnitude within a certain range, said voltage sensitive means actuating the relay means for the high speed drive means to cause continuous energizing of the high speed means when said electric voltage has a magnitude in a range different from said first mentioned range, said voltage producing means producing an electric voltage within said first mentioned range when said part is relatively close to a selected position of adjustment, said voltage producing means producing an electric current within the second mentioned range when said part is spaced at distances farther away from a selected position of adjustment.

4. The mechanism of claim 3 wherein said part is mounted in said path by means accommodating coasting movement of the part, and wherein said relay for said low speed drive means is actuated to cause de-energizing of said low speed drive means when said part moves to a position next to but not coincident which an adjusted position for said part.

5. In a control system for adjusting a part movable in a path to selected positions of adjustment for said part, a pair of motors, signal means regulated by said part producing a signal voltage depending in amplitude upon the amount of displacement of said part from a selected position for said part, a pair of voltage sensitive regulating circuits receiving the signal voltage produced by said signal means, means operatively interconnecting the regulating circuits whereby one is placed in motor-controlling condition exclusively of the other in response to signal voltages of predetermined amplitude and less and the other is placed in motor-controlling condition exclusively of said one in response to signal voltages exceeding said predetermined amplitude, means operatively connecting one regulating circuit to one motor whereby said one motor is actuated during such time as said one regulating circuit is in motor-controlling condition, and means operatively connecting the other regulating circuit to the other motor whereby said other motor is actuated during such time as said other regulating circuit is in motor-controlling condition.

6. In a control system for adjusting a part movable in a path to selected positions of adjustment for said part, a high speed and a low speed reversible motor drive means, a voltage source, signal means regulated by said part producing a signal voltage depending in amplitude upon the amount of displacement of said part from a selected position of adjustment for the part and having a phase relation with reference to said voltage source depending upon the direction of displacement of said part from a selected position of adjustment for the part, a pair of voltage sensitive regulating circuits, means operatively interconnecting the regulating circuits whereby one is placed in motor-controlling condition exclusively of the other in response to signal voltages of predetermined amplitude and less and the other is placed in motor-controlling condition exclusively of said one in response to signal voltages exceeding said predetermined amplitude, means operatively connecting one regulating circuit to one motor drive means whereby said one motor drive means is actuated during such time as the one regulating circuit is in motor-controlling condition and actuated in a direction depending upon the phase relation of the signal voltage and the voltage source, and means operatively connecting the other regulating circuit to the other motor drive means whereby said other motor drive means is actuated during such time as said other regulating circuit is in motor-controlling condition and actuated in a direction depending upon the phase relation of the signal voltage and voltage source.

7. Mechanism for adjusting the position of a part mounted for movement in a path into selected positions of adjustment, said mechanism comprising the combination of a reversible low speed drive means and a reversible high speed drive means, means operatively connecting each drive means to said part whereby it is operable to move the part during such time as the particular drive means is energized, and control means for energizing selectively said low and high speed drive means, said control means comprising a voltage source, voltage producing means regulated by the part producing an electric voltage variable in magnitude in relation to the extent that the part is positioned away from a selected position of adjustment and having a phase relation with reference to the voltage source depending upon the direction that the part is positioned away from a selected position of adjustment, voltage sensitive means sensitive to the magnitude of the voltage produced by said producing means and to the phase relation of such voltage, and electric relay means for each drive means for energizing the drive means, said voltage sensitive means actuating the relay means for the low speed drive means to cause continuous energizing of the low speed drive means when said electric voltage has a magnitude within a certain range and energizing the low speed drive means in a direction dependent upon the phase relation of the voltage, said voltage sensitive means actuating the relay means for the high speed drive means to cause continuous energizing of the high speed drive means when said voltage has a magnitude in a range different from said first mentioned range and energizing the high speed drive means in a direction dependent upon the phase relation of the voltage, said voltage producing means producing a voltage within said first mentioned range when said part is relatively close to a selected position of adjustment and a voltage within the second mentioned range when the part is spaced at distances farther away from a selected position of adjustment.

References Cited in the file of this patent

UNITED STATES PATENTS

| | | |
|---|---|---|
| 660,045 | Carroll | Oct. 16, 1900 |
| 692,428 | Clement | Feb. 4, 1902 |
| 1,725,861 | Grueter | Aug. 27, 1929 |
| 2,313,272 | Schock et al. | Mar. 9, 1943 |
| 2,342,967 | Peters | Feb. 29, 1944 |
| 2,438,545 | Davidson | Mar. 30, 1948 |
| 2,543,950 | Yardeny et al. | Mar. 6, 1951 |
| 2,561,346 | De Vlieg et al. | July 24, 1951 |
| 2,597,355 | Masuy | May 20, 1952 |
| 2,664,923 | Ferrari | Jan. 5, 1954 |
| 2,673,316 | Doeg et al. | Mar. 23, 1954 |
| 2,739,626 | Southworth et al. | Mar. 27, 1956 |
| 2,761,473 | Denton | Sept. 4, 1956 |